Figure 4:
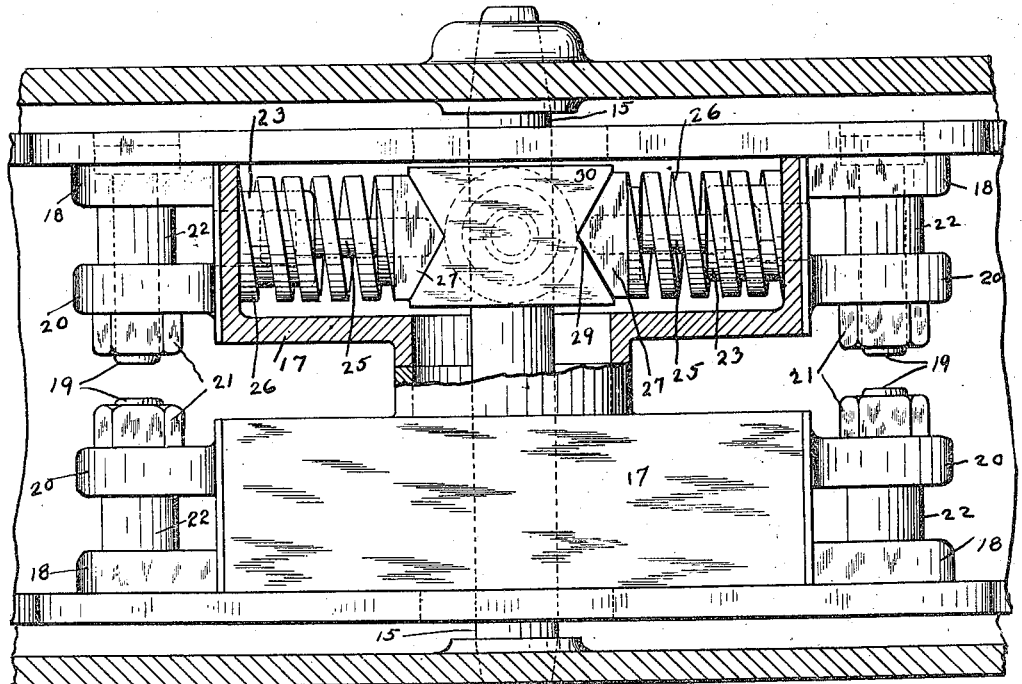

F. R. WILLSON.
SPRING VEHICLE WHEEL.
APPLICATION FILED APR. 15, 1914.
1,156,960.
Patented Oct. 19, 1915.
2 SHEETS—SHEET 1.
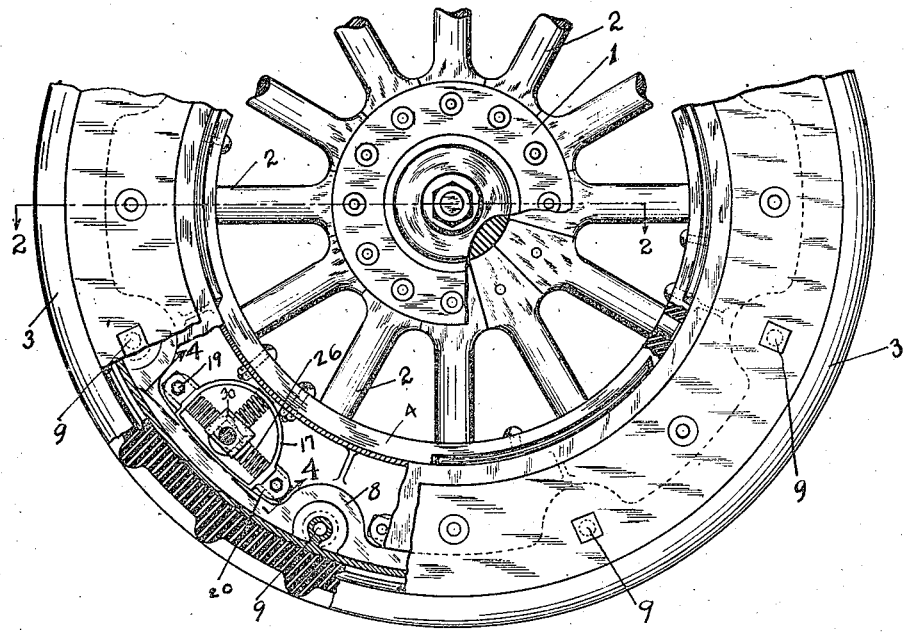
Fig. 1.
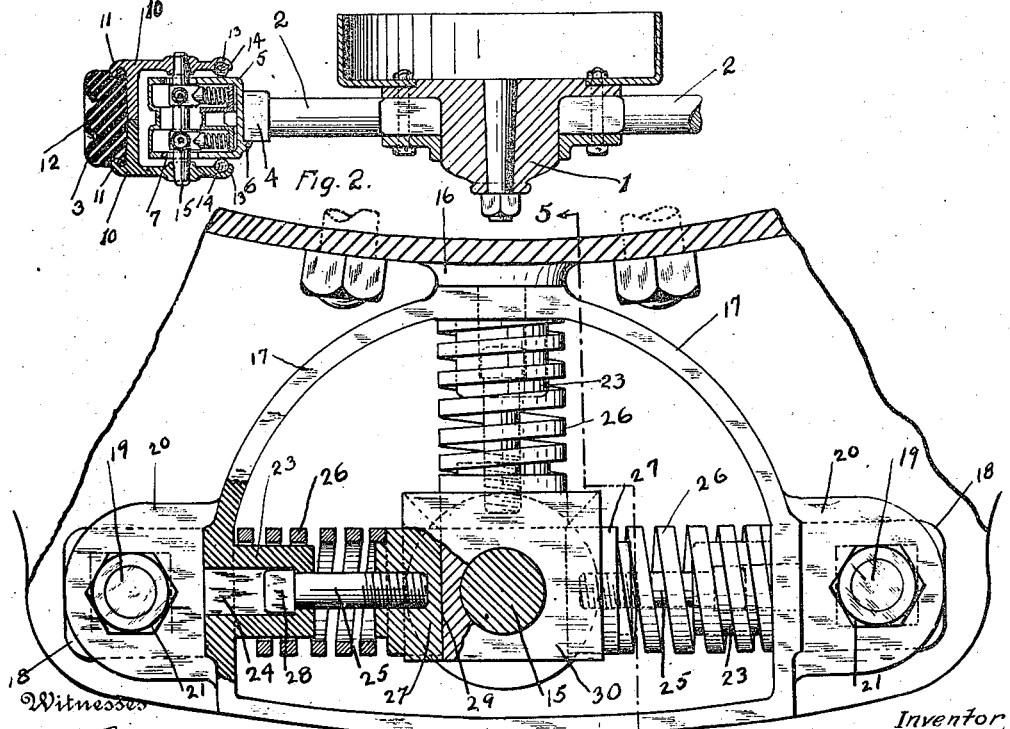
Fig. 2.
Fig. 3.
Witnesses
Inventor
FREEMAN R. WILLSON
Attorney

F. R. WILLSON.
SPRING VEHICLE WHEEL.
APPLICATION FILED APR. 15, 1914.

1,156,960.

Patented Oct. 19, 1915.
2 SHEETS—SHEET 2.

Witnesses
Geo. E. Kricker
A. L. Phelps

Inventor
Freeman R. Willson
By C. C. Shepherd, Attorney

UNITED STATES PATENT OFFICE.

FREEMAN R. WILLSON, OF WORTHINGTON, OHIO.

SPRING VEHICLE-WHEEL.

1,156,960.  Specification of Letters Patent.  Patented Oct. 19, 1915.

Application filed April 15, 1914. Serial No. 831,896.

*To all whom it may concern:*

Be it known that I, FREEMAN R. WILLSON, a citizen of the United States, residing at Worthington, in the county of Franklin and State of Ohio, have invented certain new and useful Improvements in Spring Vehicle-Wheels, of which the following is a specification.

My invention relates to spring vehicle wheels of the type designed to replace the ordinary pneumatic tire of the present-day motor vehicle although, if desired, my wheel may be applied to other types of vehicles.

The main object of my invention resides in the provision of a wheel wherein all of the component parts are secured together in such manner that the liability of collapse of the wheel is reduced to a minimum.

I have further designed my wheel that the spoke and tread portions are preferably assembled in a manner that there will be very little, if any, relative movement rotatably between these portions. However, I preferably do employ a structure in which the tread and spoke portions are slightly yieldable rotatably with regard to each other, but this yielding nature is such that the two parts will always return to their original position.

This yielding construction between the two parts is advisable upon the drive wheels of motor vehicles to alleviate the shock due to a sudden application of power.

Another object of my invention resides in the provision of a plurality of sets of springs symmetrically arranged about the periphery of the wheel, these springs being further arranged to all interact in a manner to completely absorb all of the shocks now absorbed by pneumatic tires.

A further object of my invention resides in the provision of a structure coöperating with these sets of springs to normally hold them in retracted position, or, in other words, to prevent their complete expansion. This construction results in the elimination of all rattle and renders the operation of the device more certain. In this connection, I also provide caps for the ends of the springs so arranged that they slidingly engage their cross head structures, while the wheel is functioning.

Another object of my invention resides in the provision of a supporting structure for each set of cushioning springs, this supporting structure being rigidly attached to either the spoke or tread portion and also a cross head rigidly carried by the other of said spoke or tread portions, this cross head serving as a bearing for all of the springs of one set when said springs are under compression.

Figure 5:
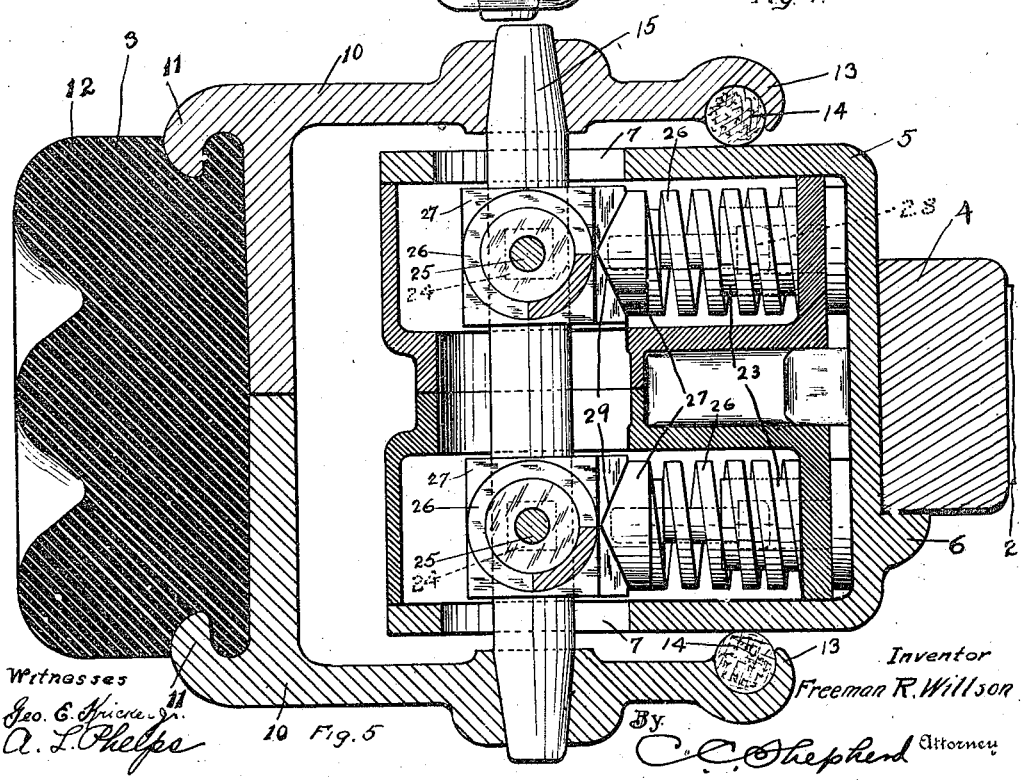

Other objects of my invention will become more apparent after a further detailed description of the accompanying sheets of drawings, in which similar characters of reference designate corresponding parts and in which:

Figure 1 is a partial side elevation and partial section of my wheel, Fig. 2 is a section taken on line 2—2 of Fig. 1 and looking in the direction of the arrows, Fig. 3 is an enlarged section showing in detail one of the clusters of springs and showing the tread portion removed therefrom, Fig. 4 is an enlarged section taken on line 4—4 of Fig. 1, and, Fig. 5 is an enlarged sectional view of the outer portion of the spoke structure showing this spring arrangement in connection with the tread portion on an enlarged scale from that shown in Fig. 2, and taken on line 5—5 of Fig. 3.

My wheel in general comprises three main portions, the hub portion 1, the spoke portion 2 and the tread portion 3. The spoke and the hub portions of my wheel can be made in any desired manner to agree with the vehicle upon which it is to be mounted. Upon the felly 4 of the spoke portion, I have attached a channel-shaped member 5, this channel member being provided with a stop 6 on one side to accurately center the same with respect to the central plane of the spokes. This channel member is further provided with a series of slots or openings 7, the purpose of which will become more apparent as this specification progresses and the outer portions of the legs are also cut out at repeated intervals as is shown at 8. These cut out portions are provided to permit the transverse passage of clamping bolts 9 for clamping the two sections 10, forming a complemental channel bed adapted to coöperate with the channel 5. The channel member thus formed forms a portion of what I have termed the tread member and it will be noted that its outer periphery is provided with hooks 11 of any suitable construction and adapted to grip the rubber tire 12, while its opposite or inner periphery is also provided with hooks 13 forming seats for suitable packing members 14. These packing members are preferably of a special construction and composition in order to render the operating parts of the wheel impervious to dust and moisture and likewise to give sufficient lubrication to afford an easy relative movement between the two channel members. It will be noted that a drawing up of the bolts 9, draws the two members 10 forming the outer or tread channel, into close engagement with each other and in so doing, the cross pins shown at 15, whose ends are both tapered to fit complemental tapered apertures, are rigidly held in place.

The cushioning structure of my wheel, preferably comprises a plurality of sets of springs symmetrically arranged about the periphery of the wheel, these sets being rigidly secured to either the spoke member or the tread member and exerting an influence upon the opposite. In the drawings, I have chosen to show these cushioning sets as being rigidly carried by the spoke member. The band 5 forming the inner channel is provided at intervals with bosses 16 upon which are adapted to rest, spring supporting members or casings 17. These casings have one side open, this open side being adapted to face against one of the legs forming the inner channel 5, this channel being also provided with socketed bosses 18. As will be apparent, especially from Figs. 3 and 4, these bosses 18 are apertured and socketed to receive bolts 19 which then pass through ears 20 upon the casing members 17, which are then held in place by drawing up of the nuts 21. In order to prevent tightening of the nuts 21 to such a degree that the ears 20 will be broken, I have provided these bolts with short pipe sections 22 which serve as supports between the legs of the inner channel member 5 and the spring casings themselves.

The spring supporting or casing members themselves are each provided with three inwardly projecting bosses shown at 23, these bosses being provided with a square bore the major portion of their lengths, as is shown at 24 and terminating in a circular bore to comfortably fit the shank of bolts 25. Each of the inwardly projecting bosses 23 forms a seating portion for the springs 26, these springs being arranged in the manner shown, wherein two are oppositely disposed to each other and the third being radially arranged. All of these springs are initially compressed to a slight degree and held in this restrained position by means of the spring caps 27 threaded on to one end of the bolts 25, release of these springs being prevented by the engagement of the square heads 28 of the bolts in the manner clearly shown to the left of Fig. 3. Also, these bolts are prevented from being unscrewed from the spring caps 27 because of the square bores 24 in which they fit. All of these spring caps 27 are provided on their outside or working face with a V-shaped tongue 29 adapted to coöperate with V-shaped grooves similarly formed in the sides of cross heads 30. These cross heads are adapted to receive the spring caps 27 of each of the three springs 26 forming each set and are themselves rigidly carried by the tread member by means of the cross pin 15 previously referred to. It will also be noted that I have used two sets of three springs at repeated intervals around the periphery of the wheel, each set of springs being arranged equally upon opposite sides of the central plane of the wheel. This arrangement is desirable, although, of course, it is understood that it is not absolutely necessary to the practicing of my invention.

As has been previously related, all of the springs 26 forming the cushioning sets are initially placed under a slight compression and held so by means of the spring caps 27 and the bolts 25. I do this both for the purpose of preventing unnecessary rattle and also to make the springs actuate the instant that a strain is placed upon them. The operation of my device is as follows: The instant the wheel meets a slight obstruction, the tread portion 3 is caused to rise slightly leaving the center portion stationary. This upward movement of the tread is cushioned by means of each of the cushioning sets and is proportionately distributed through all of the sets about the entire wheel. The set on the lower half of the wheel in vertical alinement with its axle, carries the entire shock placed upon it by means of the radially arranged spring 26. The cross pin 15 carrying the cross head 30 is rigidly attached to the members 10 forming the tread portion and consequently will, therefore, move with the tread portion. This upward movement in turn compresses the spring 26, leaving the corresponding spring on the upper half of the wheel unaffected. Should the rebound be excessive, this spring on the upper half of the wheel comes into play to check the same. The remaining springs of the various sets around the periphery of the wheel are also caused to actuate slightly and for the purposes of description, I will describe the action of those in horizontal alinement with the axle. In this case, the springs 26 on the upper half of the wheel will be compressed because of the vertical movement of the cross pins 15, these cross pins also carrying the cross heads 30. However, because of the spring caps 27 and the bolts 25, the springs on the lower half of the wheel will not come into play and the cross heads themselves will come out of engagement with the caps 27 on the lower half of the wheel. However, these springs do come into play in case of rebound, as must be apparent.

It must, therefore, be apparent that I have provided a very efficient type of spring wheel in which all of the ordinary shocks absorbed by a pneumatic tire are absorbed. Further, because of the peculiar arrangement of opposing springs 26, a sudden application of power to the driving wheels will cause them to slightly yield rotatably and in this manner the shock caused by too sudden an application of power, is considerably alleviated.

What I claim, is:

1. A spring vehicle wheel comprising a hub and spoke portion, a tread portion, a channel member divided into circular sections and adapted to be held together forming a portion of said tread portion, cross pins having tapered ends adapted to seat themselves in tapered apertures in said split channel sections, and a plurality of clusters of springs symmetrically arranged around and carried by said spoke portion, each cluster being arranged to coöperate with one of said cross pins.

2. A spring vehicle wheel comprising a hub and spoke portion, a tread portion, a plurality of sets of springs carried by one of said portions, a cross head structure disposed between the springs of each set and carried by the other of said portions, caps for the ends of said springs arranged to slidingly engage their cross head structures, and means independent of said springs for connecting said caps to prevent the complete expansion of the springs.

3. A spring vehicle wheel comprising a hub and spoke portion, a tread portion, a plurality of sets of springs carried by one of said portions, a cross head structure disposed between the springs of each set and carried by the other of said portions, caps for the ends of said springs arranged to slidingly engage their respective cross head structures, and means for holding said springs laterally rigid but permitting compression thereof.

4. A spring vehicle wheel comprising a hub and spoke portion, a tread portion, a plurality of sets of springs carried by one of said portions, a cross head structure disposed between the springs of each set and carried by the other of said portions, and caps for the ends of said springs arranged to have a sliding bearing contact only on said cross head structure.

5. A spring vehicle wheel comprising a hub and spoke portion, a tread portion, a plurality of sets of springs carried by one of said portions, a cross head structure disposed between the springs of each set and carried by the other of said portions, said springs being arranged to coöperate with said cross heads but not permanently connected therewith, and means for holding said springs in restrained position as regards complete expansion but permitting compression thereof when actuated by movement of said cross heads.

6. A spring vehicle wheel comprising a hub and spoke portion, a tread portion, a plurality of sets of springs carried by one of said portions, said sets comprising opposing springs, a cross head structure disposed between the opposing springs of each set and carried by the other of said portions, a spring cap for one end of each spring and slidably bearing against its respective cross head, and connecting means between each spring cap and the supporting portion for the opposite end of its spring from that on which the cap bears to hold the springs confined.

7. A spring vehicle wheel comprising a hub and spoke portion, a tread portion, a plurality of spring supporting members carried by said spoke portion, cushioning sets comprising opposing springs and a radially arranged spring, a cross head for each set against which all of its springs bear, a spring cap for one end of each spring and adapted to bear on said cross heads, a bolt connecting each cap to its supporting member, said bolts passing through said springs and being connected to said supporting members to prevent complete relaxing of said springs, and a cross pin for each cross head rigidly attached to the tread portion.

In testimony whereof I affix my signature in presence of two witnesses.

FREEMAN R. WILLSON.

Witnesses:
EDWARD WILLSON,
WALTER E. L. BOOK.